United States Patent
Doornekamp

(10) Patent No.: US 7,255,224 B2
(45) Date of Patent: Aug. 14, 2007

(54) FEED CONVEYOR

(75) Inventor: Martin Doornekamp, Nijkerk (NL)

(73) Assignee: FPS Food Processing Systems B.V. (NL)

( * ) Notice: Subject to any disclaimer, the term of this patent is extended or adjusted under 35 U.S.C. 154(b) by 0 days.

(21) Appl. No.: 11/038,489

(22) Filed: Jan. 21, 2005

(65) Prior Publication Data

US 2005/0183935 A1 Aug. 25, 2005

(30) Foreign Application Priority Data

Jan. 22, 2004 (EP) .................................. 04075189

(51) Int. Cl.
*B65G 17/00* (2006.01)
(52) U.S. Cl. ...................... 198/779; 198/384; 198/375
(58) Field of Classification Search ................ 198/779, 198/384, 375, 432
See application file for complete search history.

(56) References Cited

U.S. PATENT DOCUMENTS

| | | | |
|---|---|---|---|
| 4,366,896 A | 1/1983 | Tomosue | |
| 4,940,130 A * | 7/1990 | Aquino et al. | 198/432 |
| 6,401,913 B1 | 6/2002 | Blanc | |
| 6,415,902 B1 * | 7/2002 | Vis et al. | 198/384 |
| 6,454,101 B1 * | 9/2002 | Doornekamp et al. | 209/668 |

FOREIGN PATENT DOCUMENTS

| | | |
|---|---|---|
| EP | 0 006 396 | 1/1980 |
| GB | 2 307 394 | 5/1997 |
| JP | 9-84482 | 3/1997 |

* cited by examiner

*Primary Examiner*—Joe Dillon, Jr.
(74) *Attorney, Agent, or Firm*—Stites & Harbison PLLC; Marvin Petry

(57) ABSTRACT

An endless conveyor for receiving, conveying in a conveying direction and delivering rotation-symmetrical products. The conveyor is provided with at least a single endless transport element, as well as with a number of transverse elements extending perpendicularly to the conveying direction. At least a single hourglass-shaped roller is provided on each transverse element, wherein the rollers form a corresponding at least single row and wherein between each two successive rollers in a row there is a conveying position for a product. The conveyor includes a lay-on portion and a successive downstream portion which are situated in different planes, the angle between these planes being greater than 180° as measured from above.

4 Claims, 1 Drawing Sheet

FEED CONVEYOR

Figure 1:
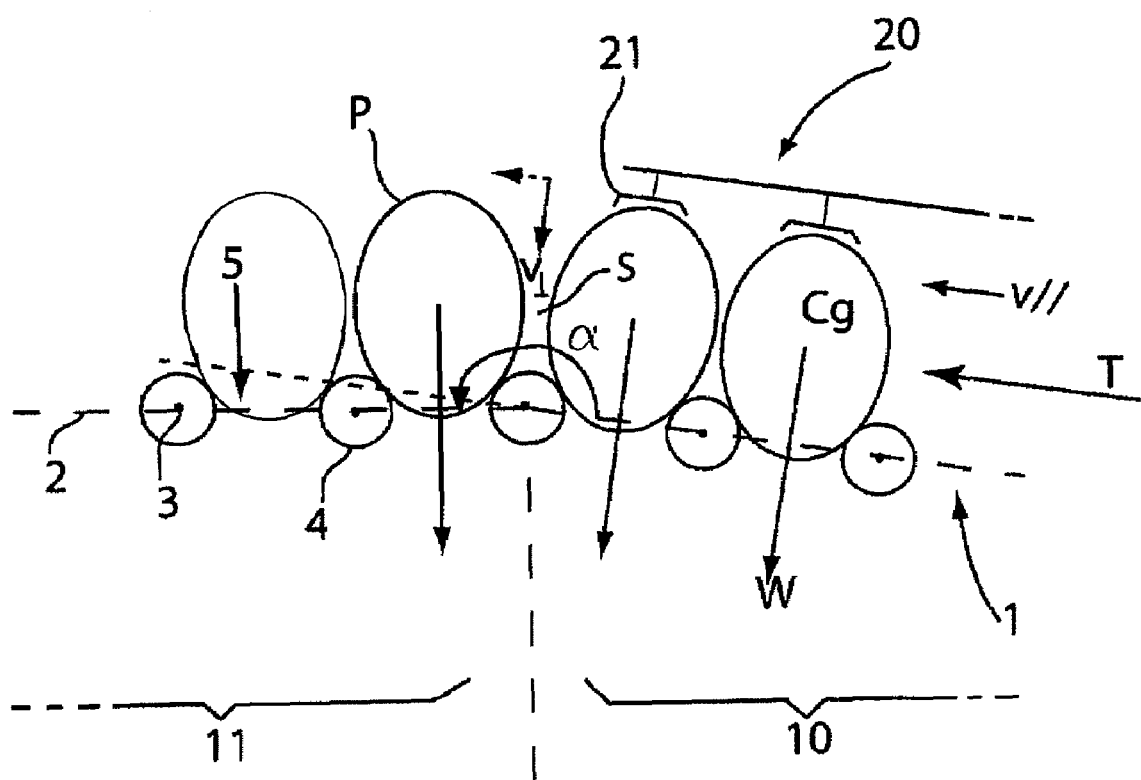

The present invention relates to an endless conveyor for receiving, conveying direction and delivering rotation-dymmetrical products.

Such apparatuses are well known. Mostly, these apparatuses are called roller conveyors. Products such as eggs are placed on so-called lay-on rollers. Next, the products are conveyed to a main conveyor, from where the eggs are transferred into packages. Placing the eggs on the lay-on portion of such a roller conveyor is generally done with suction cups, while the pattern of the suction cups corresponds to the conveying positions for the eggs on the roller conveyor. Conventionally, the eggs are subjected to suction by the suction cups, picked up, conveyed, and delivered again, with their long axes in substantially vertical direction. While being so delivered and placed on the rollers, the eggs will slightly swing to and fro out of this substantially vertical orientation because of the suction cups being flexibly suspended and moving along. During this lateral to-and-fro movement, the eggs may tick each other. It has been found that this lateral movement is so limited that breakage virtually does not occur. The other movement is the vertical movement, whereby the most upstream eggs already placed on the rollers may come into contact with the most downstream eggs suspended from the suction cups during their downward movement while being laid on. The movement that these eggs make relative to the eggs already in lying position is much greater than the above-mentioned lateral movement. In other words, their relative velocity is much greater and therefore a greater impulse transfer will take place upon ticking or collision. This means that a correspondingly larger impact force will occur. This has indeed proved to entail a greater risk of breakage.

In order to remedy the above-described problem, the apparatus according to the present invention is characterized in that the lay-on portion and the successive downstream portion of the conveyor are situated in different planes, the angle between these planes, reckoned in the conveying direction, being greater than 180°, the angle between the different planes being more particularly at least 185°.

What is very suitably accomplished in this way is that the centers of gravity of the products on opposite sides of the kink come to lie farther apart. Thus, more interspace is created for the purpose of laying-on the products, and the products will have a lesser chance of colliding against each other and thus getting damaged.

Further details of the apparatus according to the invention will be elucidated in FIG. 1 which schematically represents a side elevation of the apparatus.

In FIG. 1 an endless conveyor 1 is shown, provided with a transport element 2. Such a transport element 2 is typically an endless chain passing over two gearwheels, with mostly one of the gearwheels being driven with a is motor. Transverse elements 3 are attached to the chain, are perpendicular to it (perpendicular to the plane of the drawing) and mostly extend between two of these chains (only a single one is drawn in this perpendicular elevation). Summarizing, the endless conveyor 1 therefore consists mostly of two endless transport elements 2 or chains mutually connected through transverse elements S. For the present situation, the conveying direction is indicated with an arrow T.

Attached to the transverse elements 3 in this exemplary embodiment are hourglass-shaped rollers 4. These transverse elements are mostly pivots enabling rotation of the rollers 4. Defined between each pair of successive rollers 4 is a conveying position 5, also called nest, affording accommodation for a product P resting on two sides on two of such rollers. For the purpose of the present invention, the products P are supposed to be rotation-symmetrical, being, for instance, eggs. This means among other things that after the eggs have been laid on, the eggs at some point will turn away to an orientation in which the long axes of the eggs, which are substantially vertical when the eggs are being conveyed and laid on, come to lie approximately parallel to the transverse elements 3.

In FIG. 1 the situation is shown with the kink between two parts of the conveyor, viz. a lay-on portion 10 and the successive portion 11, represented with an angle $\alpha$. The products P, viz. eggs, suspended from suction cups, that is, with the long axes substantially downwards, are laid onto the rollers 4.

Placing the eggs onto the rollers is mostly done in groups, that is, the eggs hang from suction cups 21 which themselves are accommodated in a frame 20, the groups forming patterns of at least a single row %, or a number of rows next to each other when the conveyor is several rows wide. FIG. 1 shows two eggs of the group being laid onto the lay-on portion and, downstream in the conveying direction T, a last egg of the group which has just been laid on. Suction cups 21 and frame 20 are represented schematically.

Of one of the eggs, a center of gravity Cg is indicated, while a normal W to a supporting surface (to be imagined parallel to the plane through the transverse elements 3) indicates the direction of the vector for the weight. Also, represented is an egg (with associated normal) which is understood to have just been laid onto the rollers and which has already passed the kink in the direction T. Clearly, the normals on the right and the left of the kink, respectively, i.e. of eggs on the lay-on portion 10 and on the successive portion 11, diverge. As a result, between the eggs following each other immediately on the right and on the left of the kink, an interspace S will be obtained which will generally be greater than the interspace between eggs of one and the same group. To clarify the above-discussed lateral mutual movements for the eggs suspended from the suction cups, and the downward movements for the same eggs but now relative to the eggs already laid on, two velocity vectors, v// and v⊥, respectively, are schematically represented. Most clearly, v⊥ is generally greater than v//. Adjacent the interspace S, at v⊥, this v// has been represented once more in dotted lines, the impact force in the latter case depending on the composition of these two vectors, viz. the net force resulting from the net relative velocity.

The invention claimed is:

1. An endless conveyor for receiving, conveying in a conveying direction and delivering rotation-symmetrical products, said conveyor comprising:
   an endless transport mechanism moving in a conveying direction,
   a number of transverse elements mounted successively to the transport mechanism and extending perpendicularly to the conveying direction,
   a single roller on each successive transverse element, said transverse elements forming a row in the conveying direction, and wherein between each two successive rollers in the row there is a conveying position for a product,
   said transverse elements forming a lay-on conveyor portion and a successive downstream conveyor portion, wherein the transverse elements in the lay-on portion are situated in a first plane and wherein the transverse elements in the successive downstream portion are situated in a second plane, the first and second planes intersecting at a kink, and a placement unit provided above the lay-on portion and immediately adjacent the kink for initially placing successive groups of products in the conveying positions of successive rollers of the lay-on portion just upstream from the kink, such that, when a previously-placed group of products placed on the lay-on portion is moved downstream past the kink and completely onto the successive portion and a newly-placed group of products is then initially placed on the lay-on portion by the placement unit, a downstream one of the newly-placed group of products on the lay-on portion adjacent the kink is immediately adjacent an upstream one of the previously-placed group of products in the successive portion adjacent the kink, and such that there is a predetermined plane interspace between products of the newly-placed group placed by the placement unit in the lay-on portion and also between products of the previously-placed group in the successive portion, and wherein the first plane of the lay-on portion and the second plane of the successive downstream portion are situated at an angle therebetween which is greater than 180° as measured from above the portions such that the predetermined plane interspace is less than kink transition interspace between the downstream one of the products of the newly-placed group placed by the placement unit in the lay-on portion and adjacent the kink and the upstream one of the products of the previously-placed group located in the successive downstream portion and adjacent the kink.

2. An apparatus according to claim 1, wherein the angle is at least 185°.

3. An apparatus according to claim 1, wherein the placement unit places at least two successive products in the row of rollers located in the lay-on portion simultaneously.

4. An apparatus according to claim 3, wherein the placement unit includes at least two suction cups for holding respective products such that there are at least two products in each group.

* * * * *